US009792215B2

(12) United States Patent
Podaima et al.

(10) Patent No.: US 9,792,215 B2
(45) Date of Patent: Oct. 17, 2017

(54) COMMAND-DRIVEN TRANSLATION PRE-FETCH FOR MEMORY MANAGEMENT UNITS

(71) Applicant: QUALCOMM Incorporated, San Diego, CA (US)

(72) Inventors: Jason Edward Podaima, Toronto (CA); Bohuslav Rychlik, San Diego, CA (US); Paul Christopher John Wiercienski, Toronto (CA); Kyle John Ernewein, Toronto (CA); Carlos Javier Moreira, Markham (CA); Meghal Varia, Brampton (CA); Serag Gadelrab, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 14/672,133

(22) Filed: Mar. 28, 2015

(65) Prior Publication Data

US 2016/0283384 A1  Sep. 29, 2016

(51) Int. Cl.
*G06F 12/12* (2016.01)
*G06F 12/0862* (2016.01)
*G06F 12/0875* (2016.01)
*G06F 12/10* (2016.01)
*G06F 12/1027* (2016.01)

(52) U.S. Cl.
CPC ...... *G06F 12/0862* (2013.01); *G06F 12/0875* (2013.01); *G06F 12/10* (2013.01); *G06F 12/1027* (2013.01); *G06F 2212/1021* (2013.01); *G06F 2212/452* (2013.01); *G06F 2212/602* (2013.01); *G06F 2212/6028* (2013.01); *G06F 2212/654* (2013.01); *G06F 2212/684* (2013.01)

(58) Field of Classification Search
CPC .................. G06F 12/0862; G06F 12/1027
USPC ........................................ 711/125
See application file for complete search history.

(56) References Cited

U.S. PATENT DOCUMENTS

| 5,796,971 | A | 8/1998 | Emberson |
| 6,128,703 | A * | 10/2000 | Bourekas ............ G06F 9/30043 |
| | | | 711/118 |
| 7,793,067 | B2 | 9/2010 | Kegel et al. |
| 8,397,049 | B2 | 3/2013 | Wang et al. |
| 2008/0133875 | A1 | 6/2008 | Cohen et al. |

(Continued)

FOREIGN PATENT DOCUMENTS

EP   1139222 A1   10/2001

OTHER PUBLICATIONS

International Search Report and Written Opinion—PCT/US2016/019314—ISA/EPO—dated Apr. 22, 2016.

(Continued)

*Primary Examiner* — Jae Yu
(74) *Attorney, Agent, or Firm* — Muncy, Geissler, Olds & Lowe, P.C.

(57) ABSTRACT

Methods and systems for pre-fetching address translations in a memory management unit (MMU) of a device are disclosed. In an embodiment, the MMU receives a pre-fetch command from an upstream component of the device, the pre-fetch command including an address of an instruction, pre-fetches a translation of the instruction from a translation table in a memory of the device, and stores the translation of the instruction in a translation cache associated with the MMU.

30 Claims, 14 Drawing Sheets

(56) References Cited

U.S. PATENT DOCUMENTS

2011/0202724 A1 8/2011 Kegel et al.
2012/0226888 A1 9/2012 Rychlik et al.
2013/0227245 A1 8/2013 Gupta et al.
2014/0258674 A1 9/2014 Kim et al.
2014/0281352 A1 9/2014 Venkatsubramanian et al.

OTHER PUBLICATIONS

Park J S., et al., "A Software-Controlled Prefetching Mechanism for Software-Managed TLBs", Microprocessing and Microprogramming, Elsevier Science Publishers, BV., Amsterdam, NL, vol. 41, No. 2, May 1, 1995 (May 1, 1995), pp. 121-136, XP004011631, ISSN: 0165-6074, DOI: 10.1016/0165-6074(95)00003-7 abstract p. 125, right-hand column, line 19-p. 127, right-hand column, line 28.

\* cited by examiner

COMMAND-DRIVEN TRANSLATION PRE-FETCH FOR MEMORY MANAGEMENT UNITS

TECHNICAL FIELD

Embodiments of the disclosure are related to command-driven translation pre-fetch for memory management units.

BACKGROUND

System-on-a-chip (SoC) devices may include one or more central processors, one or more interconnects (or buses), one or more peripheral devices (or upstream devices), and one or more slave devices. Such SoC devices may further include a memory management unit (MMU) coupled to the processor and one or more system MMUs (SMMUs) coupled to the one or more peripheral devices. An SMMU provides address translation services for peripheral device traffic in much the same way that a processor's MMU translates addresses for processor memory accesses.

The main functions of an MMU include address translation, memory protection, and attribute control. Address translation is the translation of an input address to an output address. Translation information is stored in translation tables that the MMU references to perform address translation. An MMU can store completed translations in a translation cache to avoid accessing the translation tables the next time an input address to the same block of memory is received.

Demand misses in the MMU translation cache negatively impact system performance and system costs by causing, for example, increased memory latency (delays), reduced bandwidth utilization, and increased buffering to hide the delays. Present solutions to minimize the number of such demand misses include attempting to "predict" what translations are required in the future and put them in the translation cache. Specifically, these solutions predict that previously used and nearby translations will be required in the future. In order for such prediction scheme to perform well, a high degree of temporal/spatial locality is required. In cases where there is limited spatial/temporal locality, the predictions are often incorrect, and as a result, the prediction schemes perform poorly.

SUMMARY

The following presents a simplified summary relating to one or more aspects and/or embodiments associated with the mechanisms disclosed herein for command-driven translation pre-fetch for memory management units. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

A method of pre-fetching address translations in an MMU of a device includes receiving, by the MMU, a pre-fetch command from an upstream component of the device, the pre-fetch command including an address of an instruction, pre-fetching, by the MMU, a translation of the instruction from a translation table in a memory of the device, and storing, by the MMU, the translation of the instruction in a translation cache associated with the MMU.

An apparatus for pre-fetching address translations in an MMU of a device includes logic configured to receive a pre-fetch command from an upstream component of the device, the pre-fetch command including an address of an instruction, logic configured to pre-fetch a translation of the instruction from a translation table in a memory of the device, and logic configured to store the translation of the instruction in a translation cache associated with the MMU.

An apparatus for pre-fetching address translations in an MMU of a device includes means for receiving, by the MMU, a pre-fetch command from an upstream component of the device, the pre-fetch command including an address of an instruction, means for pre-fetching, by the MMU, a translation of the instruction from a translation table in a memory of the device, and means for storing, by the MMU, the translation of the instruction in a translation cache associated with the MMU.

A non-transitory computer-readable medium for pre-fetching address translations in an MMU of a device includes at least one instruction to receive a pre-fetch command from an upstream component of the device, the pre-fetch command including an address of an instruction, at least one instruction to pre-fetch a translation of the instruction from a translation table in a memory of the device, and at least one instruction to store the translation of the instruction in a translation cache associated with the MMU.

Other objects and advantages associated with the mechanisms disclosed herein will be apparent to those skilled in the art based on the accompanying drawings and detailed description.

BRIEF DESCRIPTION OF THE DRAWINGS

A more complete appreciation of embodiments of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
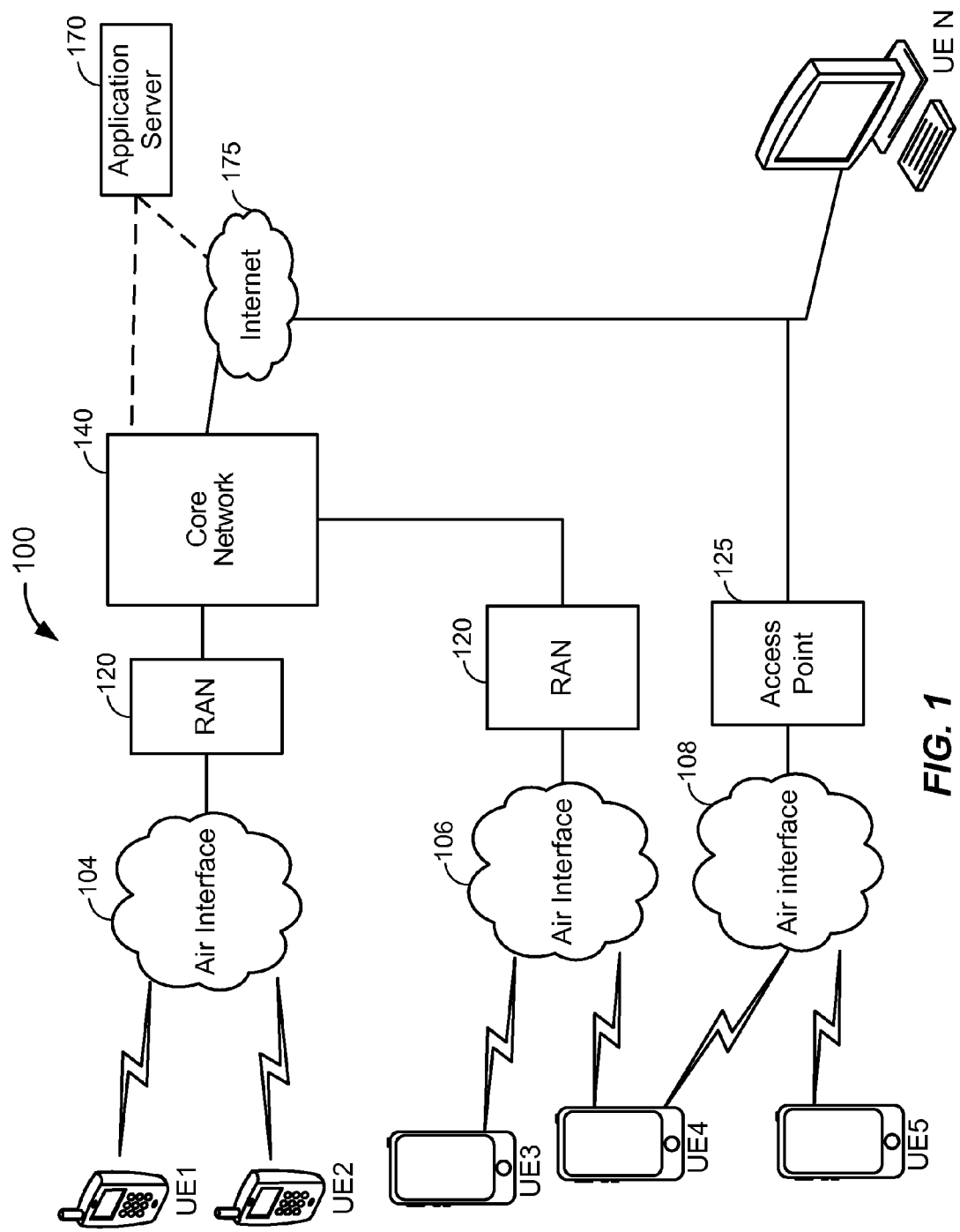
FIG. 1 illustrates a high-level system architecture of a wireless communications system in accordance with an embodiment of the disclosure.

Methods and systems for pre-fetching address translations in a memory management unit (MMU) of a device are disclosed herein. In an embodiment, an MMU receives a pre-fetch command from an upstream component of the device, the pre-fetch command including an address of an instruction, pre-fetches a translation of the instruction from a translation table in a memory of the device, and stores the translation of the instruction in a translation cache associated with the MMU.

These and other aspects of the disclosure are described in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, certain embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the disclosure. The wireless communications system 100 contains UEs 1 . . . N. The UEs 1 . . . N can include cellular telephones, including "smartphones," personal digital assistant (PDAs), pagers, a laptop computer, a tablet computer, a desktop computer, and so on. For example, in FIG. 1, UEs 1 . . . 2 are illustrated as cellular calling phones, UEs 3 . . . 5 are illustrated as cellular touchscreen phones or "smartphones," and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
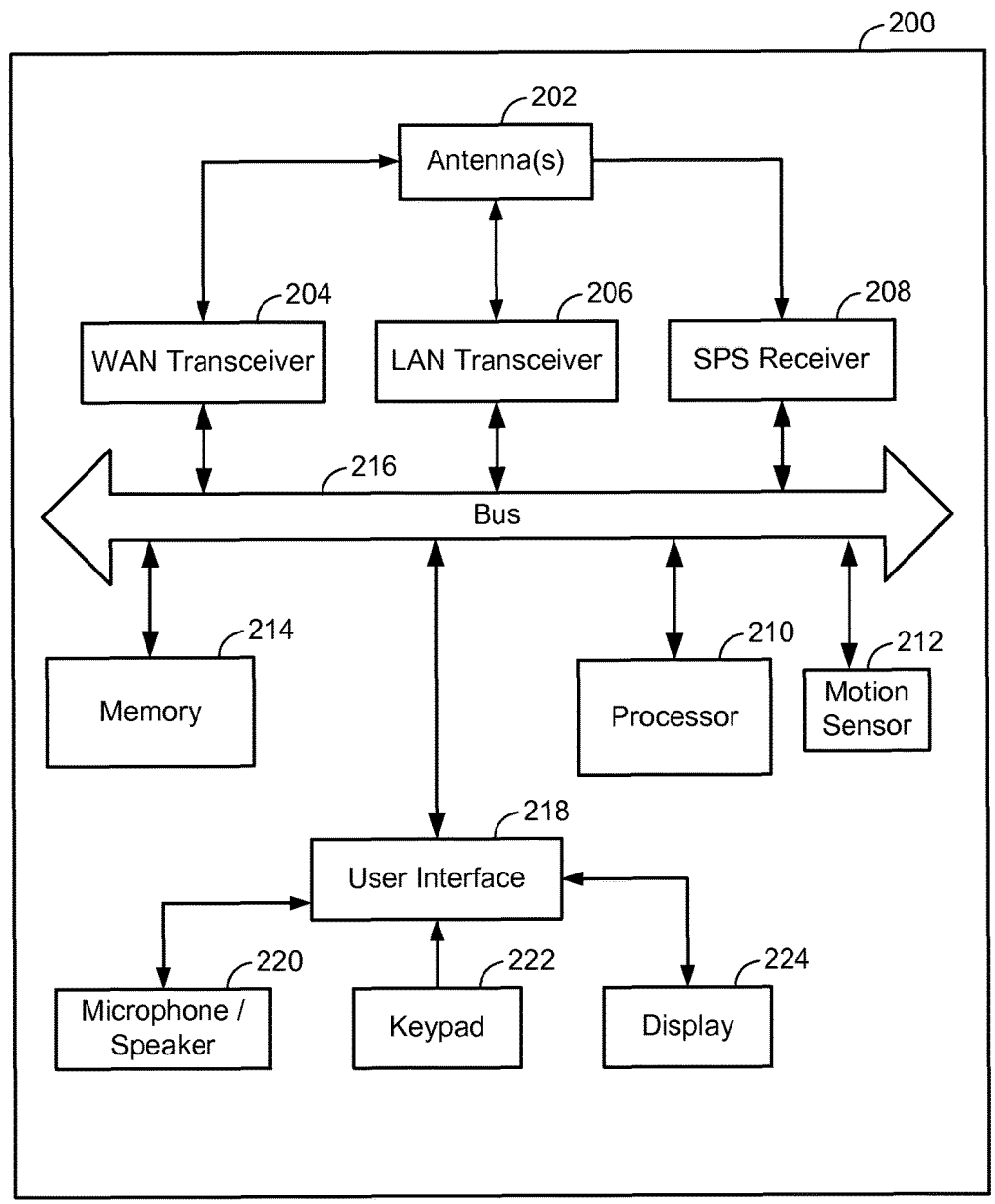
FIG. 2 illustrates an exemplary mobile device that may be used in an operating environment that can determine position using wireless techniques, according to one aspect of the disclosure.

The various embodiments of the disclosure may be implemented on any of a variety of devices, such as mobile device 200 in FIG. 2. Mobile device 200 may correspond to any of UEs 1 . . . N in FIG. 1. Referring to FIG. 2, for the sake of simplicity, the various features and functions illustrated in the block diagram of FIG. 2 are connected together using a common bus 216, which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

While internal components of mobile devices such as the mobile device 200 can be embodied with different hardware configurations, a basic high-level mobile device configuration for internal hardware components is shown in FIG. 2. The mobile device 200 may include one or more wide area network (WAN) transceiver(s) 204 that may be connected to one or more antennas 202. The WAN transceiver 204 comprises suitable devices, hardware, and/or software for communicating with and/or detecting signals to/from the RAN 120 in FIG. 1, and/or directly with other mobile devices within a network. In one aspect, the WAN transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (IEEE 802.16), etc. The mobile device 200 may also include one or more local area network (LAN) transceivers 206 that may be connected to one or more antennas 202. The LAN transceiver 206 comprises suitable devices, hardware, and/or software for communicating with and/or detecting signals to/from access point 125 in FIG. 1, and/or directly with other mobile devices within a network. In one aspect, the LAN transceiver 206 may comprise a Wi-Fi (802.11x) communication system suitable for communicating with one or more wireless access points; however in other aspects, the LAN transceiver 206 comprise another type of local area network, personal area network, (e.g., Bluetooth). Additionally, any other type of wireless networking technologies may be used, for example, Ultra Wide Band, ZigBee, wireless USB etc.

As used herein, the abbreviated term "wireless access point" (WAP) may be used to refer to access point 125 and/or RAN 120. Specifically, in the description presented below, when the term "WAP" is used, it should be understood that embodiments may include a mobile device 200 that can exploit signals from a plurality of access points 125, a plurality of RANs 120, or any combination of the two. The specific type of WAP being utilized by the mobile device 200 may depend upon the environment of operation. Moreover, the mobile device 200 may dynamically select between the various types of WAPs in order to arrive at an accurate position solution. In other embodiments, various network elements may operate in a peer-to-peer manner, whereby, for example, the mobile device 200 may be replaced with the WAP, or vice versa. Other peer-to-peer embodiments may include another mobile device (not shown) acting in place of one or more WAP.

An SPS receiver 208 may also be included in the mobile device 200. The SPS receiver 208 may be connected to the one or more antennas 202 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the mobile device's 200 position using measurements obtained by any suitable SPS algorithm.

A motion sensor 212 may be coupled to a processor 210 to provide movement and/or orientation information which is independent of motion data derived from signals received by the WAN transceiver 204, the LAN transceiver 206 and the SPS receiver 208. By way of example, the motion sensor 212 may utilize an accelerometer (e.g., a MEMS device), a gyroscope, a geomagnetic sensor (e.g., a compass), an altimeter (e.g., a barometric pressure altimeter), and/or any other type of movement detection sensor. Moreover, the motion sensor 212 may include a plurality of different types of devices and combine their outputs in order to provide motion information. For example, the motion sensor 212 may use a combination of a multi-axis accelerometer and orientation sensors to provide the ability to compute positions in 2-D and/or 3-D coordinate systems.

The processor 210 may be connected to the WAN transceiver 204, LAN transceiver 206, the SPS receiver 208 and the motion sensor 212 via bus 216. The processor 210 may include one or more microprocessors, microcontrollers, and/or digital signal processors that provide processing functions, as well as other calculation and control functionality. The processor 210 may also be coupled to memory 214 for storing data and software instructions for executing programmed functionality within the mobile device 200. The memory 214 may be on-board the processor 210 (e.g., within the same IC package), and/or the memory may be external memory to the processor and functionally coupled over the common bus 216 (or other data bus).

The mobile device 200 may include a user interface 218 which provides any suitable interface systems, such as a microphone/speaker 220, keypad 222, and display 224 that allows user interaction with the mobile device 200. The microphone/speaker 220 provides for voice communication services using the WAN transceiver 204 and/or the LAN transceiver 206. The keypad 222 comprises any suitable buttons for user input. The display 224 comprises any suitable display, such as, for example, a backlit LCD display, and may further include a touch screen display for additional user input modes.

As used herein, the mobile device 200 may be any portable or movable device or machine that is configurable to acquire wireless signals transmitted from, and transmit wireless signals to, one or more wireless communication devices or networks. As shown in FIG. 2, the mobile device 200 is representative of such a portable wireless device. Thus, by way of example but not limitation, the mobile device 200 may include a radio device, a cellular telephone device, a computing device, a personal communication system (PCS) device, or other like movable wireless communication equipped device, appliance, or machine. Also, "mobile device" is intended to include all devices, including wireless devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile device."

Figure 3:
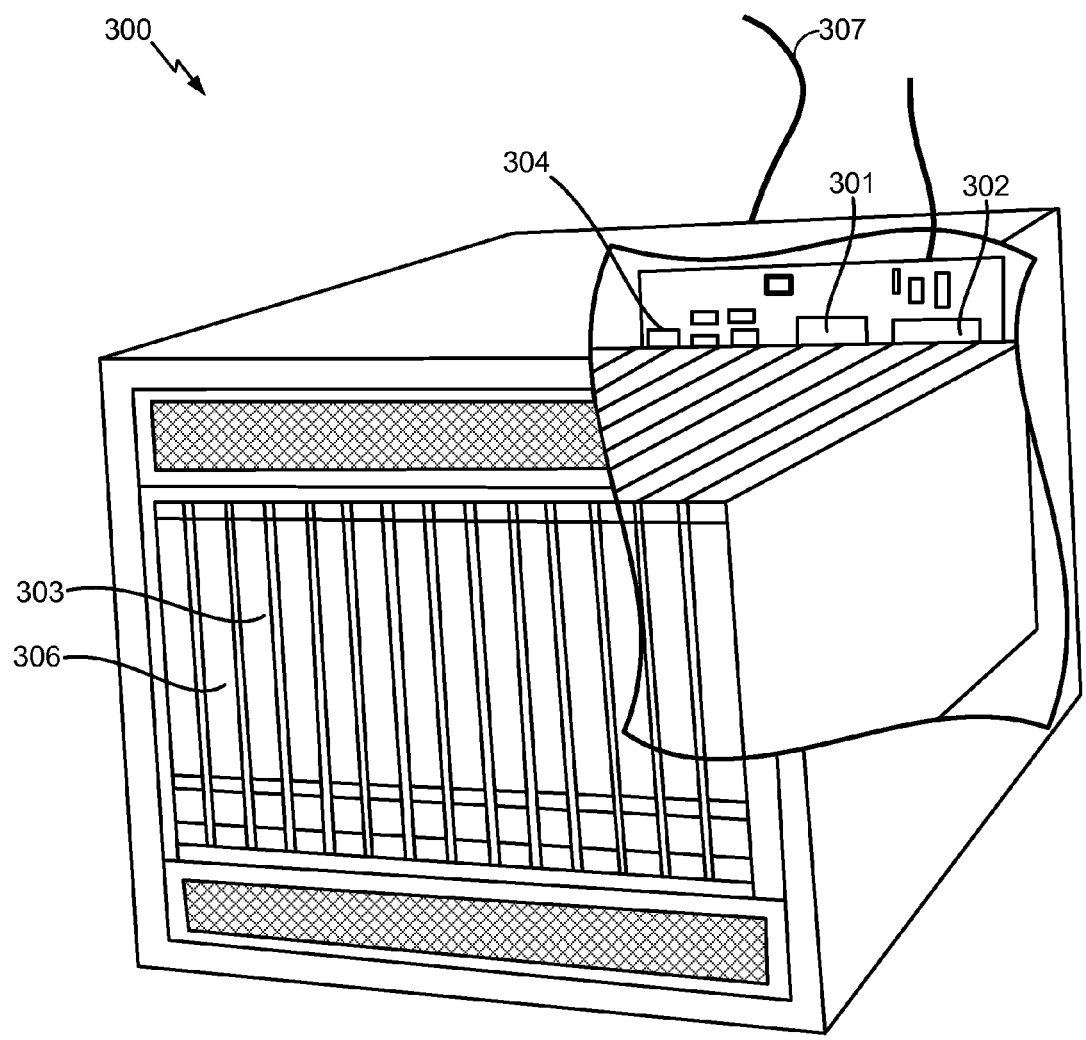
FIG. 3 illustrates a server in accordance with an embodiment of the disclosure.

The various embodiments may also be implemented on any of a variety of commercially available server devices, such as server 300 illustrated in FIG. 3. In an example, the server 300 may correspond to one example configuration of the server 170 in FIG. 1. In FIG. 3, the server 300 includes a processor 301 coupled to volatile memory 302 and a large capacity nonvolatile memory, such as a disk drive 303. The server 300 may also include a floppy disc drive, compact disc (CD) or DVD disc drive 306 coupled to the processor 301. The server 300 may also include network access ports 304 coupled to the processor 301 for establishing data connections with a network 307, such as a local area network coupled to other broadcast system computers and servers or to the Internet.

The following table provides definitions for certain terminology used throughout the present disclosure:

TABLE 1

Terminology and Definitions

| Terminology | Definition |
| --- | --- |
| Address Translation | The transform of an input transaction (which includes an input address) to an output transaction (which includes an address) based on the information in one or more translation tables and the MMU itself |
| Complete(d) Translation | A translation that is complete, and contains all the information necessary for address translation |
| Input Address | An address reference (transaction) performed by an upstream device |
| Memory Management Unit (MMU) | The hardware and/or software required to perform address translation (and other memory management functions) for the processor or peripheral devices |
| Output Address | An address reference (transaction) processed by the MMU |
| Partial Translation | A translation that is not complete, and contains only part of the information necessary for address translation |
| Response | Any response made by a device; however, in the context of an MMU, it often refers to the response to a request to read or write an address |

TABLE 1-continued

Terminology and Definitions

| Terminology | Definition |
| --- | --- |
| Request | Any request performed by a device; however, in the context of an MMU, it often refers to a request to read or write an address |
| System MMU (SMMU) | The MMU for peripheral devices; also known as the input-output MMU (IOMMU) |
| Transaction | A pair of a request and a response to the request. In a typical system, memory references performed by a device are executed by using transactions - a request to read/write memory and the response to that request |
| Translate | The process of applying the address translation transform |
| Translation | The information required to translate an input transaction |
| Translation Cache | A storage device capable of storing "translations" (either partial or complete); a TLB (translation look-aside buffer) is a specific form of translation cache that is sometimes used as a synonym for "translation cache" |
| Translation Table | The data structure in memory that contains translation information (e.g., address translation mapping information, memory attributes, memory permissions, etc . . . ); also known as a "page-table" |
| Translation Table Walker | A machine that traverses (or walks) the translation table to collect the information required for address translation process; also known as a "page-table walker" |
| Upstream Device | A device performing address references that will eventually be processed by the MMU |

Figure 4A:
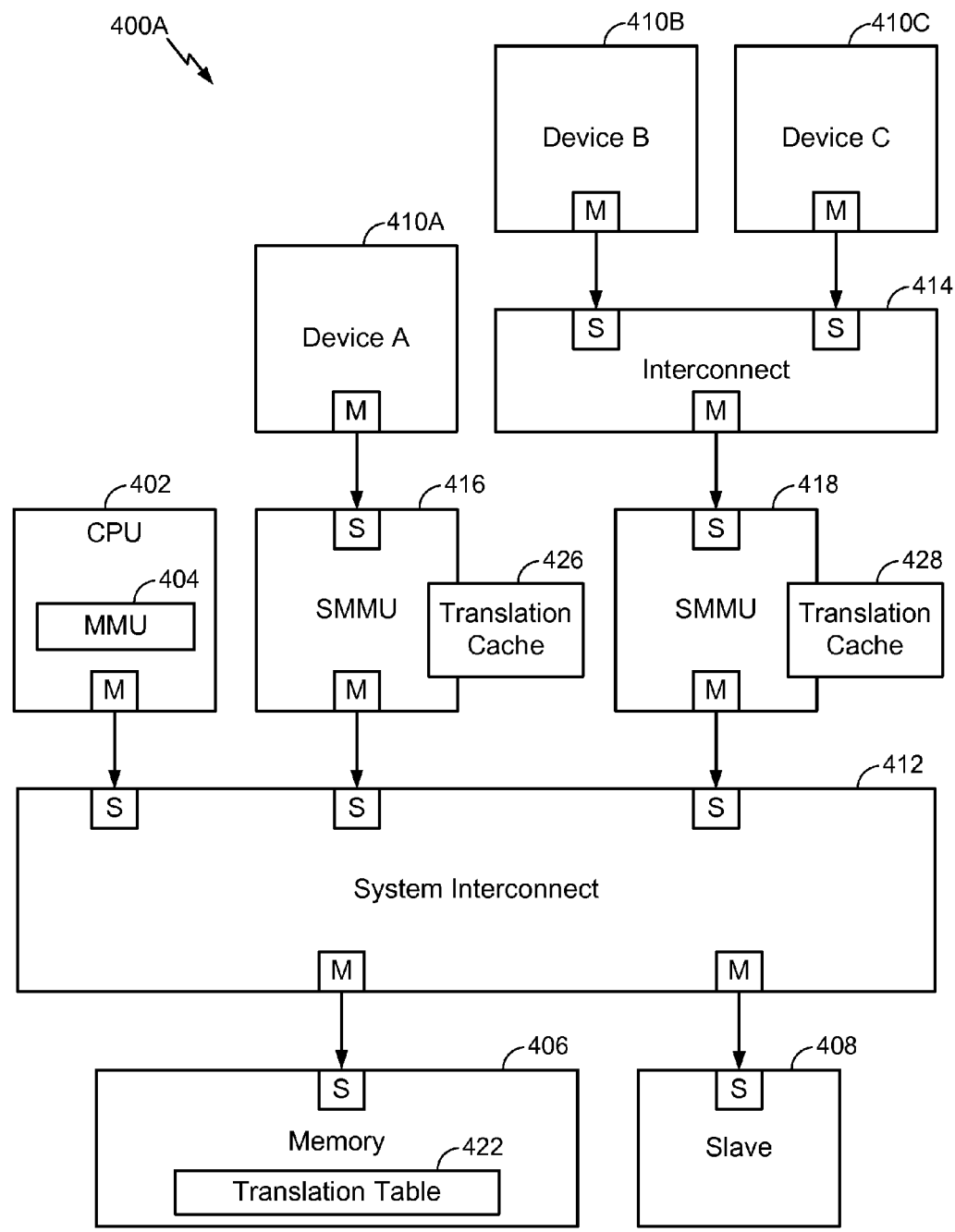
FIGS. 4A and 4B illustrate exemplary systems according to various aspects of the disclosure.
Figure 4B:
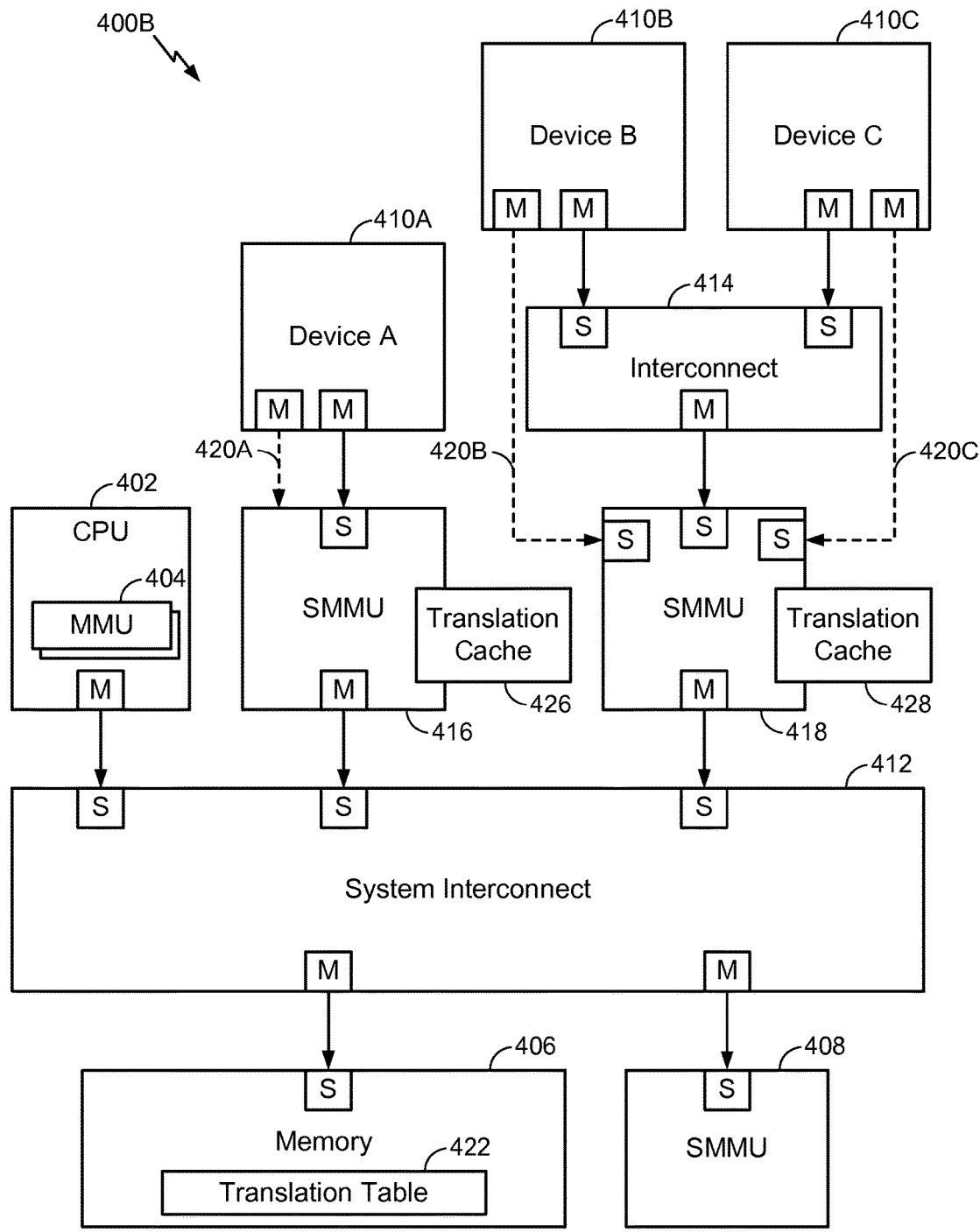

FIGS. 4A-B illustrate exemplary systems 400A and 400B according to an aspect of the disclosure. The systems 400A/400B may be incorporated into the mobile device 200 in FIG. 2 or the server 300 in FIG. 3. The components of systems 400A/400B include one or more central processors, such as processor 402 (which may correspond to processor 210 in FIG. 2 or processor 301 in FIG. 3), one or more interconnects (or buses), such as interconnects 412 and 414 (which may correspond to bus 216 in FIG. 2), one or more peripheral devices (or upstream devices), such as devices A-C 410A-C, and one or more slave devices, such as a memory 406 (which may correspond to memory 214 in FIG. 2 or volatile memory 302 and/or disk drive 303 in FIG. 3) and slave 408. The memory 406 may include a translation table 422 accessible by the MMU 404, SMMU 416, and/or SMMU 418 to fetch address translations, as described herein. Devices A-C 410A-C may include any other component of the device (e.g., mobile device 200 in FIG. 2) that is "upstream" from the perspective of the MMU 404/SMMUs 416, 418. That is, devices A-C 410A-C may be any component of the device embodying system 400A/400B from which the MMU 404/SMMUs 416, 418 receive commands/instructions, such as a graphics processing unit (GPU), a digital signal processor (DSP), a Peripheral Component Interconnect Express (PCIe) root complex, a USB interface, a LAN interface, a Universal Asynchronous Receiver/Transmitter (UART), etc. Slave 408 may be any "downstream" component of the device embodying the system 400A/400B that receives output from the MMU 404/SMMUs 416, 418. For example, slave 408 may include system registers, memory mapped input/output, device interconnects, etc.

As illustrated in FIGS. 4A/4B, the MMU 404 is coupled to processor 402. As will be appreciated, although FIGS. 4A/4B illustrate MMU 404 as being part of processor 402, MMU 404 may be externally coupled to processor 402.

As noted above, system 400A/400B also includes SMMUs 416 and 418. An SMMU provides address translation services for upstream device traffic in much the same way that a processor's MMU, such as MMU 404, translates addresses for processor memory accesses. As illustrated in FIGS. 4A/4B, each SMMU 416/418 includes or is coupled to one or more translation caches 426/428, respectively. Although not illustrated in FIGS. 4A/4B, the MMU 404 may also include or be coupled to one or more translation caches.

Referring to FIGS. 4A/4B, each component includes an "S" and/or an "M," indicating that it is a "slave" to the upstream device and/or a "master" to the downstream device. As illustrated in FIGS. 4A/4B, SMMUs, such as SMMUs 416 and 418, reside between a system device's master port and the system slaves. For example, as illustrated in FIGS. 4A/4B, SMMUs 416 and 418 reside between the master ports of devices A-C 410A-C and the system slave, e.g., system interconnect 412.

A single SMMU may serve a single peripheral device or multiple peripheral devices, depending on system topology, throughput requirements, etc. FIGS. 4A/4B illustrate an example topology in which device A 410A has a dedicated SMMU 416 while devices B 410B and C 410C share SMMU 418. Note that although the arrows shown in FIGS. 4A/4B illustrate unidirectional communication between the illustrated components, this is simply to show exemplary communication through the MMU 404 and SMMUs 416 and 418. As is known in the art, the communication between the components in system 400A/400B may be bidirectional.

The main functions of an MMU, such as MMU 404 and SMMUs 416 and 418, include address translation, memory protection, and attribute control. Address translation is the translation of an input address to an output address. Translation information is stored in translation tables that the MMU references to perform address translation, such as translation table 422 in FIGS. 4A/4B. There are two main benefits of address translation. First, it allows devices to address a large physical address space. For example, a 32 bit device (i.e., a device capable of referencing $2^{32}$ address locations) can have its addresses translated by an MMU such that it may reference a larger address space (such as a 36 bit address space or a 40 bit address space). Second, it allows devices to have a contiguous view of buffers allocated in memory, despite the fact that memory buffers are typically fragmented, physically discontiguous, and scattered across the physical memory space.

A translation table, such as translation table 422 in FIGS. 4A/4B contains information necessary to perform address translation for a range of input addresses. It consists of a set of sub-tables arranged in a multi-level "tree" structure. Each sub-table is indexed with a sub-segment of the input address. Each sub-table consists of translation table descriptors. There are three base types of descriptors: 1) an invalid descriptor, which contains no valid information, 2) table descriptors, which contain a base address to the next level sub-table and may contain translation information (such as access permission) that is relevant to all sub-sequent descriptors encountered during the walk, and 3) block descriptors, which contain a base output address that is used to compute the final output address and attributes/permissions relating to block descriptors.

The process of traversing the translation table to perform address translation is known as a "translation table walk." A translation table walk is accomplished by using a sub-segment of an input address to index into the translation sub-table, and finding the next address until a block descriptor is encountered. A translation table walk consists of one or more "steps." Each "step" of a translation table walk involves 1) an access to the translation table, which includes reading (and potentially updating) the translation table, and 2) updating the translation state, which includes (but is not limited to) computing the next address to be referenced. Each step depends on the results from the previous step of the walk. For the first step, the address of the first translation table entry that is accessed is a function of the translation table base address and a portion of the input address to be translated. For each subsequent step, the address of the translation table entry accessed is a function of the translation table entry from the previous step and a portion of the input address.

A translation table walk is completed after a block descriptor is encountered and the final translation state is computed. If an invalid translation table descriptor is encountered, the walk has "faulted" and must be aborted or retried after the page table has been updated to replace the invalid translation table descriptor with a valid one (block or table descriptor). The combined information accrued from all previous steps of the translation table walk determines the final translation state of the "translation" and therefore influences the final result of the address translation (output address, access permissions, etc.).

Figure 5:
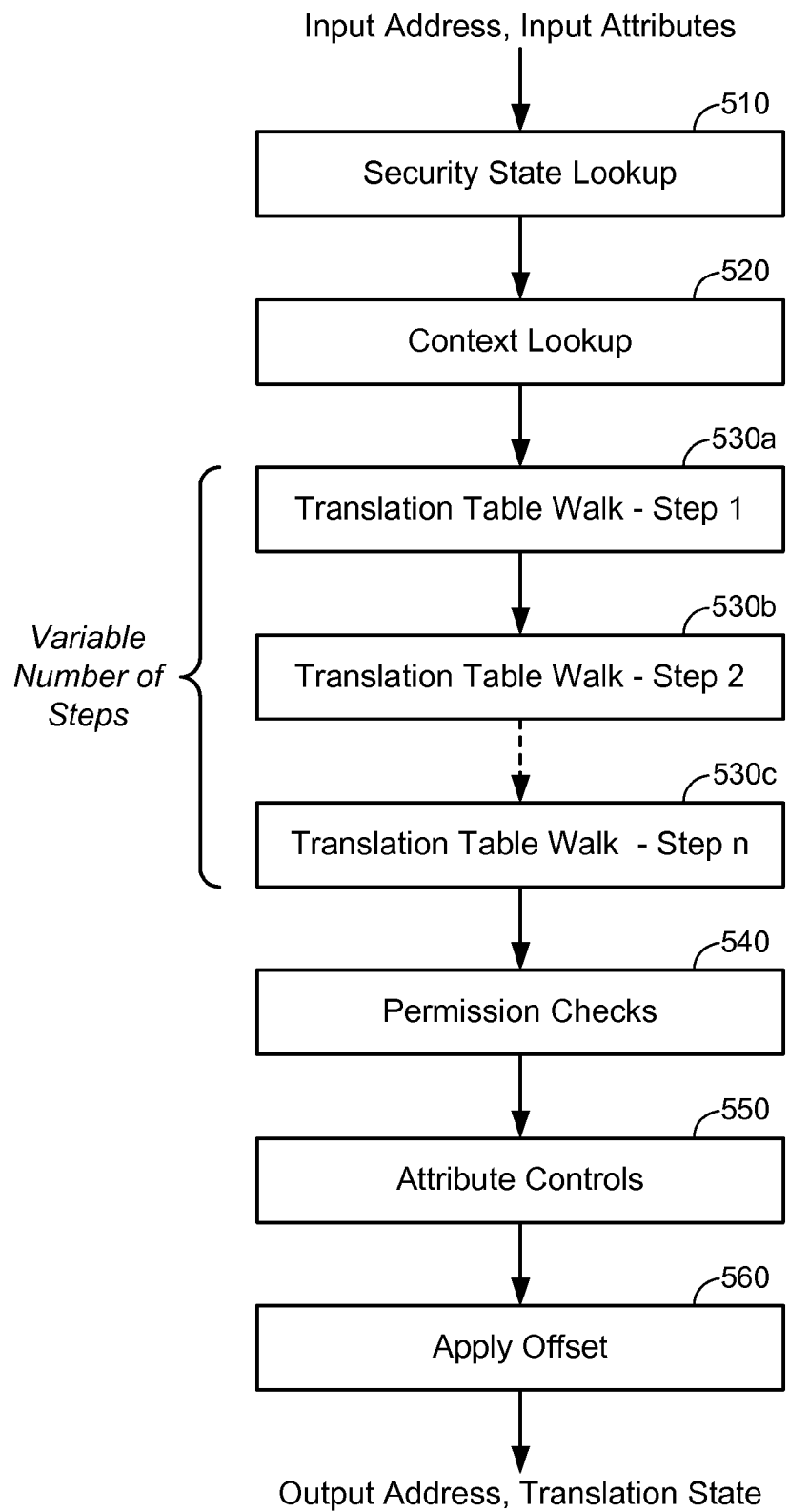
FIG. 5 illustrates the steps involved in address translation according to an aspect of the disclosure.

Address translation is the process of transforming an input address and set of attributes to an output address and attributes (derived from the final translation state). FIG. 5 illustrates the steps involved in address translation according to an aspect of the disclosure. The flow illustrated in FIG. 5 may be performed by an SMMU, such as SMMUs 416 or 418 in FIGS. 4A/4B.

At 510, the SMMU performs a security state lookup. An SMMU is capable of being shared between secure and non-secure execution domains. The SMMU determines which domain an incoming transaction belongs to based on properties of that transaction. Transactions associated with a secure state are capable of accessing both secure and non-secure resources. Transactions associated with a non-secure state are only allowed to access non-secure resources.

At 520, the SMMU performs a context lookup. Each incoming transaction is associated with a "stream ID." The SMMU maps the "stream ID" to a context. The context determines how the SMMU will process the transaction: 1) bypass address translation so that default transformations are applied to attributes, but no address translation occurs (i.e., translation tables are not consulted), 2) fault, whereby the software is typically notified of a fault, and the SMMU terminates the transaction, such that it is not sent downstream to its intended target, or 3) perform translation, whereby translation tables are consulted to perform address translation and define attributes. Translation requires the resources of either one or two translation context banks (for single-stage and nested translation, respectively). A translation context bank defines the translation table(s) used for translation, default attributes, and permissions.

At 530, the SMMU performs a translation table walk. If a transaction requires translation, translation tables are consulted to determine the output address and attributes corresponding to the input address. If a transaction maps to a bypass context, translation is not required. Instead, default attributes are applied and no address translation is performed.

At 540, the SMMU performs a permissions check. The translation process defines permissions governing access to each region of memory translated. Permissions indicate which types of accesses are allowed for a given region (i.e., read/write), and whether or not an elevated permission level is required for access. When translation is complete, the defined permissions for the region of memory being accessed are compared against the attributes of the transaction. If the permissions allow the access associated with the transaction, the transaction is allowed to propagate downstream to its intended target. If the transaction does not have sufficient permissions, the SMMU raises a fault and the transaction is not allowed to propagate downstream.

At 550, the SMMU performs attribute controls. In addition to address translation, the SMMU governs the attributes associated with each transaction. Attributes indicate such things as the type of memory being accessed (e.g., device, normal, etc.), whether or not the memory region is shareable, hints indicating if the memory region should be cached, etc. The SMMU determines the attributes of outgoing transactions by combining/overriding information from several sources, such as 1) incoming attributes, whereby incoming attributes typically only affect output attributes when translation is bypassed, 2) statically programmed values in SMMU registers, and/or 3) translation table entries.

At 560, the SMMU applies an offset. Each translation table entry defines an output address mapping and attributes for a contiguous range of input addresses. A translation table can map various sizes of input address ranges. The output address indicated in a translation table entry is, therefore, the base output address of the range being mapped. To compute the final output address, the base output address is combined with an offset determined from the input address and the range size:

Output_address=base_output_address+(input_address mod range_size)

In other words, the N least significant bits of input and output addresses are identical, where N is determined by the size of the address range mapped by a given translation table entry.

At the last step of the translation table walk process illustrated in FIG. 5 the resulting translation state represents a completed translation. The completed translations can be stored in a translation cache, such as translation cache 426/428 in FIGS. 4A/4B, to avoid having to perform all the steps of the translation table walk the next time an input address to the same block of memory is issued to the SMMU.

At any step (other than the last step) of the translation table process illustrated in FIG. 5 the resulting translation state represents a partially completed translation. The partially completed translations can be stored in a translation cache to avoid having to perform all the same steps of the translation table walk the next time a input address to the same (or adjacent) blocks of memory are issued to the SMMU. Partially completed translations are completed by performing the remaining steps of the translation walk.

The translation cache, sometimes referred to as a Translation Look-aside Buffer (TLB), is comprised of one or more translation cache entries. Translation caches store translation table information in one or more of the following forms: 1) fully completed translations, which contain all the information necessary to complete a translation, 2) partially completed translations, which contain only part of the information required to complete a translation such that the remaining information must be retrieved from the translation table or other translations caches, and/or 3) translation table data.

A translation cache, such as translation cache 426/428 in FIGS. 4A/4B, assists in minimizing the average time required to translate subsequent addresses: 1) reduces the average number of accesses required to access the translation table during the translation process, and 2) keeps translations and/or translation table information in a fast storage device. A translation cache is usually quicker to access than the main memory store containing the translation tables. Specifically, referring to FIG. 5, instead of performing a translation table walk at 530, the SMMU can perform a translation cache lookup to determine whether or not the requested address is already present in the translation cache. If it is, the SMMU can skip the translation table walk at 530 and proceed to 540.

Figure 6:
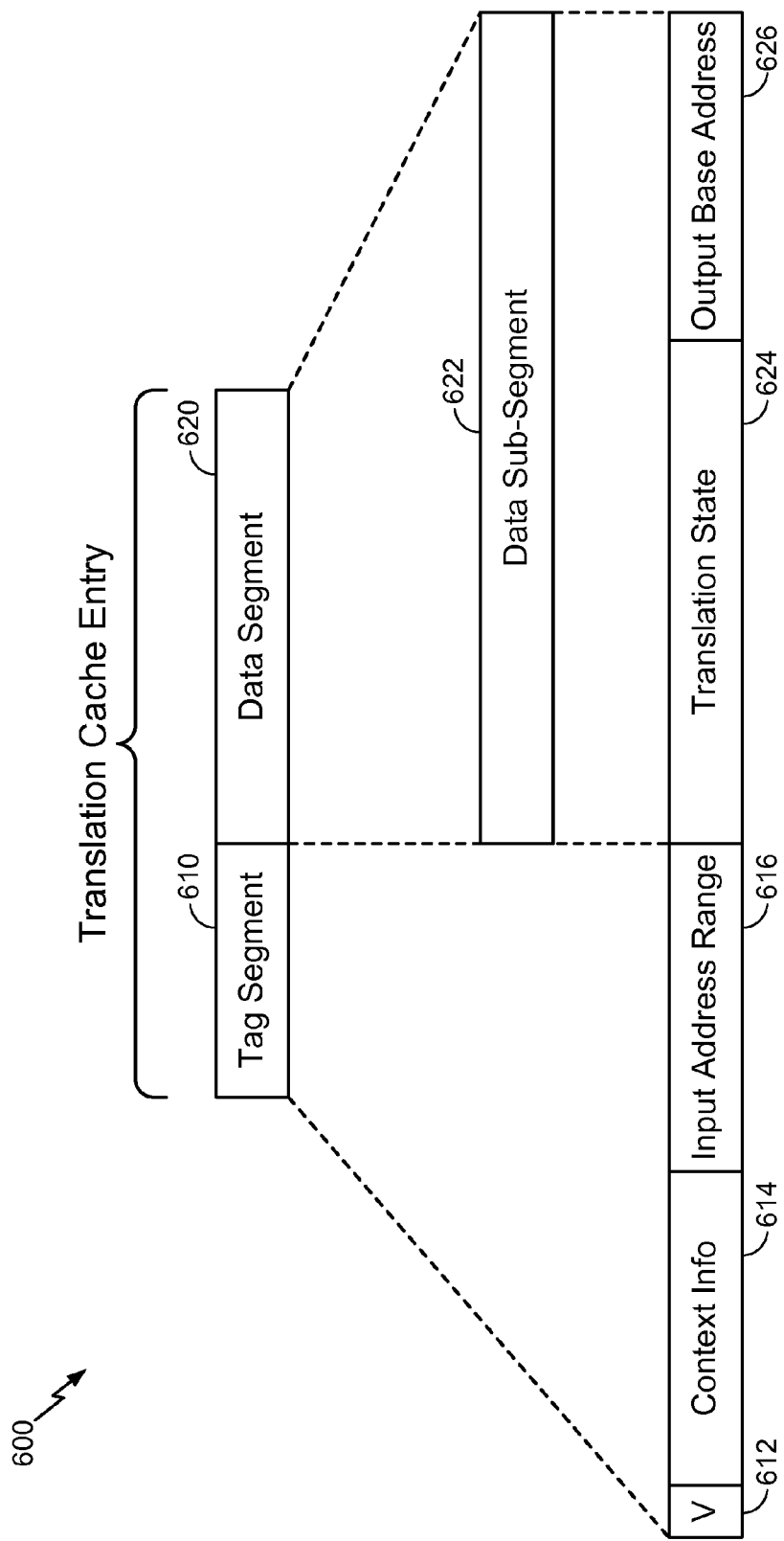
FIG. 6 illustrates an exemplary translation cache entry according to an aspect of the disclosure.

FIG. 6 illustrates an exemplary translation cache entry 600 according to an aspect of the disclosure. Translation cache entry 600 consists of a tag segment 610 and a data segment 620. The tag segment 610 comprises one or more fields that may be compared with a search comparand during a search (or lookup) of the translation cache. One of these fields may be a valid bit 612 indicating whether the translation cache entry 600 is populated with meaningful/valid information. Other fields may include an address space identifier, virtual machine ID, security state, exception level, and/or translation type, all which collectively form the "context information" 614.

Other fields may include a matching address range 616 for which the translation cache entry may (or may not) hold valid translation information. The address range 616 may be encoded as a start and end address value or by an address and address mask. Other fields, not shown, may include an invalidation address range that is used for TLB invalidation purposes. In some cases, the invalidation address range and the matching address range are always equivalent and therefore can be represented together as one field use the same storage/field (e.g., address range 616).

The data segment 620 comprises one or more data sub-segments 622 that contain information from the translation table and/or process of translation. Each sub-segment 622 may store data for one 1) fully completed translation, 2) partially completed translation, or 3) translation table entry.

Data sub-segments, such as data sub-segment 622, holding a fully completed translation contain one or more data fields. One of these fields may include a valid bit (not shown) to indicate whether the data stored in the sub-segment 622 is valid. In translation cache entries where there is only one data sub-segment 622, there is typically no need for a valid bit since the valid bit 612 in the tag segment 610 is sufficient to indicate whether the data sub-segment 622 contains valid information. The data sub-segments 622 further include one field to encode a base address 626 and one or more fields to encode the final translation state 624 resulting from performing all steps of the address translation process. This may include: 1) one or more fields that may encode the access permissions relating to the completed translation, 2) one or more fields that may encode the memory attributes relating to the completed translation, 3) one or more fields that may encode the cache attributes relating to the completed translation, or 4) one or more fields that may encode the system specific information relating to the completed translation.

Data sub-segments, such as data sub-segment 622, holding a partially completed translation contain one or more data fields. One of these fields may include a valid bit (not shown) to indicate whether the data stored in the sub-segment is valid. In translation cache entries where there is only one data sub-segment, there is typically no need for a valid bit since the valid bit 612 in the tag segment 610 is sufficient to indicate whether the data sub-segment 622 contains valid information. The data sub-segments 622 further include one field to encode a base address 626 and one or more fields to encode the final translation state 624 resulting from performing one or more of the steps of the address translation process. This may include: 1) one or more fields that may encode the access permissions relating to the partially completed translation, 2) one or more fields that may encode the memory attributes relating to the partially completed translation, 3) one or more fields that may encode the cache attributes relating to the partially completed translation, or 4) one or more fields that may encode the system specific information relating to the partially completed translation.

Data sub-segments 622 holding a translation table data translation may contain one or more data fields. One of these fields may include a valid bit to indicate whether the data stored in the sub-segment 622 is valid. In translation cache entries where there is only one data sub-segment, there is typically no need for valid bit since the valid bit 612 contained in the tag segment is sufficient to indicate whether the data sub-segment 622 contains valid information. The data sub-segments 622 may further include one field to hold/store the translation table entry.

A translation cache for completed translations consists of one or more (e.g., N) translation cache entries and each translation cache entry holds information for one completed translation.

Demand misses in the MMU translation cache negatively impact system performance and system costs by causing, for example, increased memory latency (delays), reduced bandwidth utilization, and increased buffering to hide the delays. Prior art solutions to minimize the number of such demand misses include attempting to "predict" what translations are required in the future and put them in the translation cache. Specifically, these solutions predict that previously used and nearby translations will be required in the future. This requires a high degree of temporal/spatial locality to perform well. Prediction schemes are error prone and thus can lead to "incorrect" predictions. Prediction schemes also perform poorly when there is limited spatial/temporal locality.

To minimize the number of demand misses, the present disclosure permits upstream devices, such as devices A-C 410A-C in FIGS. 4A/4B, to issue pre-fetch commands to the MMU, such as SMMUs 416 or 418, either over a shared interface where both commands and memory requests are transported (interconnects 412/414 in FIG. 4A) or directly through a private interface (interfaces 420A-B in FIG. 4B). The upstream device may have prior knowledge of future addresses that it will need and can therefore issue pre-fetch commands to the MMU to pre-load the MMU translation cache (e.g., TLB) with address translations for these future addresses, thereby avoiding "demand misses" in the translation cache when the upstream device later requests the address. Because the disclosed mechanism reduces (or eliminates) the number of demand misses, the delay through the MMU is reduced, which results in improved system performance and reduced system costs. Note that the terms "pre-fetch command(s)" and "pre-fetch instruction(s)" are used interchangeably herein.

The commands to the MMU can take the form of a issuing a pre-fetch for a single address or for multiple addresses. For a single address, the MMU can pre-fetch translations from translation tables in memory and load/fill the translations into the translation cache. For multiple addresses, the MMU can pre-fetch translations (associated with each address) from translation tables in memory and load/fill the translations into the translation cache.

As briefly noted above, there are two ways to communicate commands from upstream device(s), such as devices A-C 410A-C in FIGS. 4A/4B, to the SMMU, such as SMMU 416 or 418 in FIGS. 4A/4B. For example, pre-fetch commands can be sent on the address channel of the system bus(es) (e.g., interconnects 412/414 in FIG. 4A), along with additional signaling to distinguish pre-fetch commands from "normal" read or write transactions and to indicate pre-fetch command types and/or parameters. In this case, pre-fetch commands can be time multiplexed with regular read/write transactions over the same bus interface. Address bits [11:0] of the addresses may (optionally) be used to encode pre-fetch command information (such as command type and/or pre-fetch command parameters). Note that using address bits [11:0] to encode pre-fetch command information is an alternate to providing "additional" signaling for the pre-fetch command type and/or pre-fetch command parameters.

Alternatively, rather than sending pre-fetch commands on the address channel of the system bus(es) (e.g., 412/414 of FIG. 4A), there may be a separate dedicated pre-fetch interface between the upstream device(s) (or other pre-fetch generation engine) and an SMMU. This is shown in FIG. 4B, where the system 400B corresponds to the system 400A of FIG. 4A, but with the addition of a private pre-fetch interface 420A between device A 410A and SMMU 416, a private pre-fetch interface 420B between device 410B and SMMU 418, and a private pre-fetch interface 420C between device 410C and SMMU 418. Thus, in system 400B, device B 410B, for example, may send pre-fetch commands to SMMU 418 directly over the private pre-fetch interface 420B, rather than over the interconnect 414. In this case, because the pre-fetch commands are not sent over the system bus(es) 412/414, they do not need to include additional signaling to distinguish them from "normal" read or write transactions, but rather, only need to include signaling to indicate pre-fetch command types and/or parameters.

To generate pre-fetch commands at the upstream device, the upstream device hardware may automatically self-generate pre-fetch commands based on a priori knowledge of future addresses that the upstream device will (eventually) generate. Even if the upstream device hardware is not 100% self-aware of future addresses, it may still speculate (or approximate/guess) on future addresses that will be required in the future and issue a "speculative" translation pre-fetch command.

Alternatively, to generate pre-fetch commands at the upstream device, device software accessing memory mapped commands (e.g., in command registers) may trigger a command-driven pre-fetch. For example, the upstream device may write to a translation pre-fetch command register (e.g., located at address "B"), which triggers a pre-fetch to an address "C," for example, as specified with the command. These memory mapped commands may reside in the upstream device or alternatively in the SMMU (in which case there is no explicit communication of the pre-fetch command from the upstream device to the SMMU).

In an embodiment, instead of, or in addition to, the upstream device generating the pre-fetch commands, translation cache pre-fetch instructions can be inserted into software code by users writing the software code, thereby helping to accelerate the performance of the software. Alternatively, or additionally, pre-fetch instructions can be inserted by a compiler in cases where the compiler can derive future addresses in the instruction stream and/or data stream.

Figure 7:
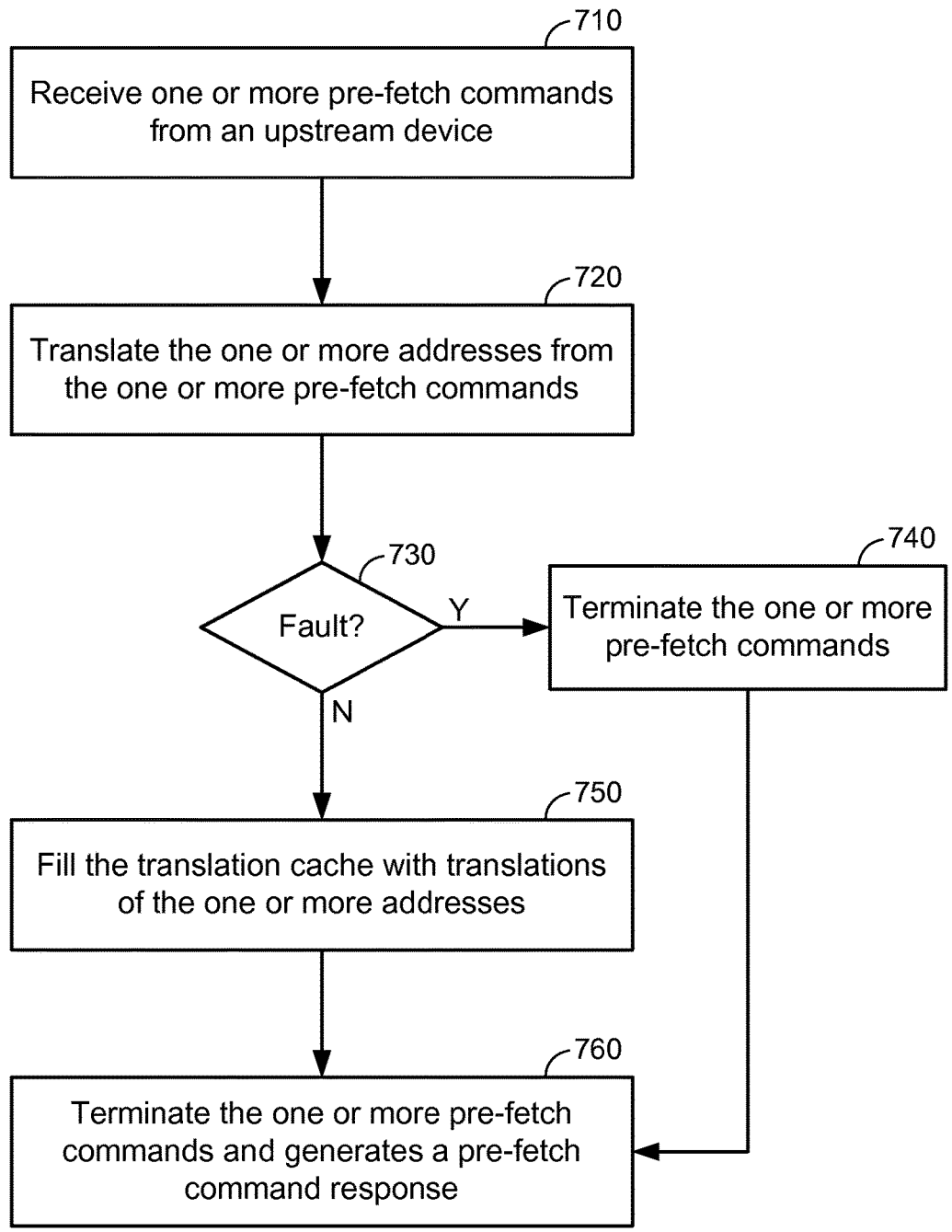
FIG. 7 illustrates an exemplary pre-fetch procedure according to an aspect of the disclosure.

FIG. 7 illustrates an exemplary pre-fetch procedure according to an aspect of the disclosure. The flow illustrated in FIG. 7 may be performed by an SMMU, such as SMMU 416 or 418 in FIGS. 4A/4B. Further, as discussed below, the flow illustrated in FIG. 7 may be performed by an MMU, such as MMU 404 in FIGS. 4A/4B. At 710, the SMMU receives one or more pre-fetch commands from the upstream device. A pre-fetch command indicates the address (or range/set of addresses) for which an address translation should be fetched.

As an extension to this step, the upstream device can further categorize pre-fetch commands as "speculative" or "non-speculative." This information can be used by the SMMU to influence quality-of-service by, for example, prioritizing non-speculative pre-fetch commands over speculative pre-fetch commands. As noted above, a speculative pre-fetch translation refers to a translation that is likely (i.e., more likely than not) to be needed in the future, while a non-speculative pre-fetch translation refers to a translation that is guaranteed to be needed in the future. As a further extension of this step, the upstream device can further specify a set of addresses using a start address and a descriptor of how to generate the next N addresses to be translated/pre-fetched, as described below with reference to FIG. 11.

Next, at 720, the SMMU translates the one or more addresses indicated in the one or more pre-fetch commands. As discussed above with reference to FIG. 5, one of the steps of translating is to first check to see whether the translation(s) is/are already in the translation cache. If it/they is/are, there is no more translation work to do and the pre-fetch procedure of FIG. 7 is terminated (the flow may optionally proceed to 760). If a translation must be performed, however, and during translation a fault is encountered (730), the fault may (optionally) be silently ignored at 740. "Silently ignoring" the fault means terminating the pre-fetch command (and generating an appropriate command termination response) and not logging/recording any faults related to command-driven translation pre-fetch in the SMMU. That is, the SMMU terminates the pre-fetch command and does not send a fault report to the upstream device, thereby treating the fault as if nothing has gone wrong. Note that in some cases, a specific fault can be ignored based on the nature of the fault, or all faults relating to pre-fetch commands/instructions can be ignored.

At 750, if the translation(s) was/were not already present in the translation cache, and the translation(s) was/were successful, the SMMU fills the translation cache with the translation(s) from 720.

Next, at 760, the SMMU terminates the one or more pre-fetch commands and generates a pre-fetch command response. The pre-fetch commands are not forwarded and are not propagated downstream to the system/memory. Thus, no memory accesses are performed to the pre-fetch address(es) related to the pre-fetch commands. The pre-fetch command response indicates to the upstream device that issued the pre-fetch command the receipt of the one or more pre-fetch commands and (optionally) indicates the success/failure of the pre-fetch commands.

Because the SMMU is not required to wait for a response from the system (downstream) memory, the pre-fetch command response can be returned immediately to the upstream device. Where a separate dedicated pre-fetch interface exists between the upstream device and the SMMU, the read/write response channel can be reused to carry the pre-fetch command response generated. Accordingly, the SMMU is obligated to follow bus protocols and bus ordering models when generating the pre-fetch command responses that are transmitted on the read/write response channels.

In an alternative embodiment, if the upstream device is a "processor" capable of executing instructions from software, such as processor 402 in FIGS. 4A/4B, a translation pre-fetch instruction can be added to the processor instruction set to enable user software (or the compiler) to opportunistically insert translation pre-fetches in the instruction stream. Upon execution of this instruction, the translation pre-fetch command is communicated to the SMMU where it is processed. Note that the processor 402 is an upstream device from the perspective of the MMU 404, even though the MMU 404 may be physically integrated into the processor 402. As such, the pre-fetch command processing discussed above with reference to an SMMU is equally applicable to an MMU integrated into a processor.

Figure 8:
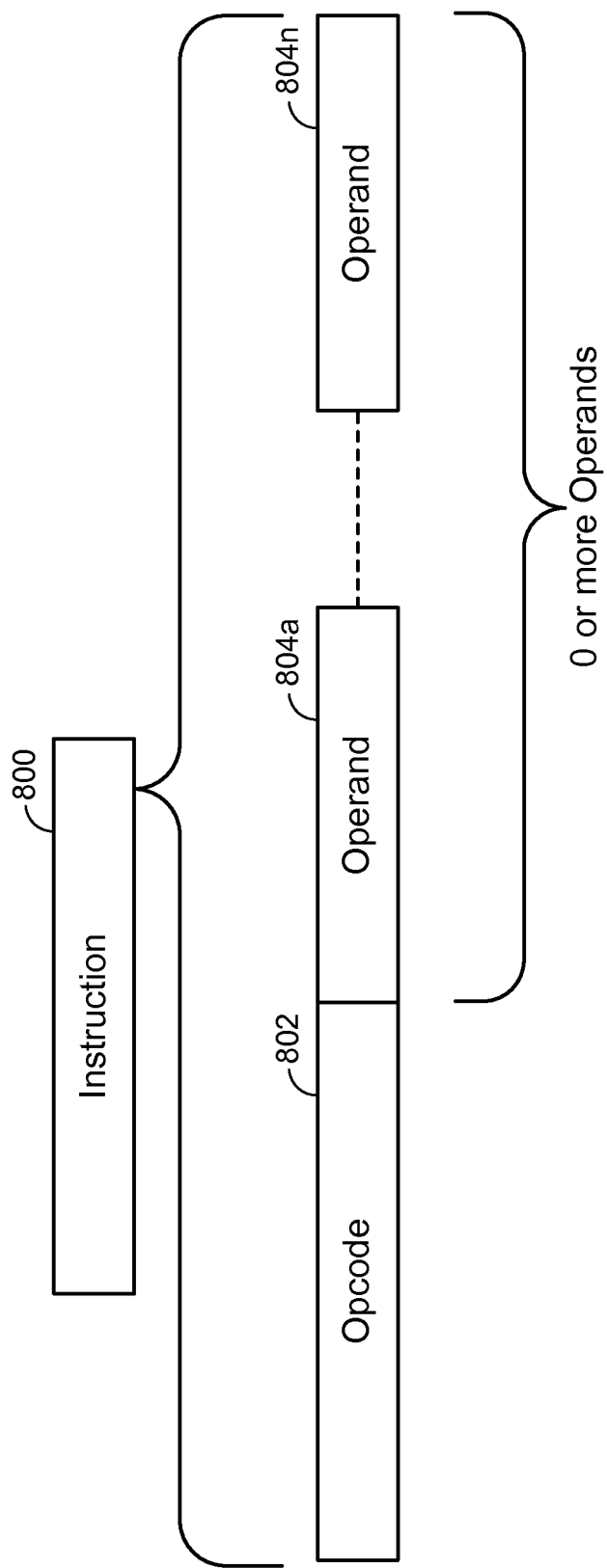
FIG. 8 illustrates an exemplary processor instruction for a central processor according to an aspect of the disclosure.

FIG. 8 illustrates an exemplary processor instruction 800 for a central processor, such as processor 402 in FIGS. 4A/4B according to an aspect of the disclosure. An instruction set of processor instructions is a set of one or more processor instructions. The processor, such as processor 402 in FIGS. 4A/4B, executes the instruction 800 or routes it to co-processors or entities capable of executing the instruction 800. An instruction, such as instruction 800, contains an operation code (opcode) 802 to encode the instruction/operation type and a set of zero (0) or more operands 804a-n. An operand 804 is an input for the process of executing the instruction 800. An instruction 800 may have zero or more operands/inputs 804.

Figure 9:
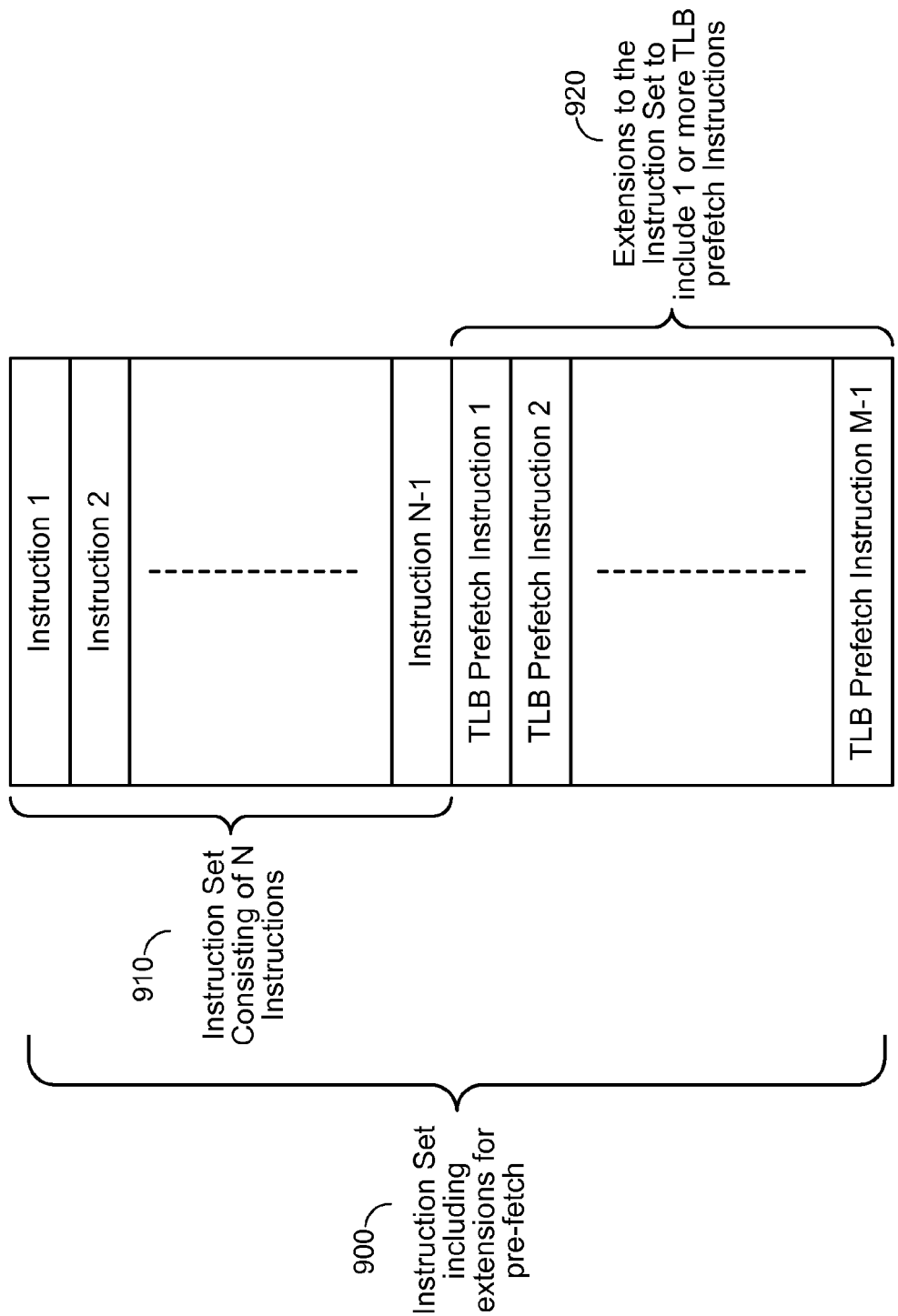
FIG. 9 illustrates an exemplary set of instructions according to an aspect of the disclosure.

The pre-fetch commands described above may be implemented as pre-fetch instructions for processors employing MMUs capable of receiving those instructions and performing translation cache pre-fetches. FIG. 9 illustrates an exemplary set of instructions 900 according to an aspect of the disclosure. As illustrated in FIG. 9, the set of instructions 900 includes 1 . . . N-1 instructions 910 and 1 . . . M-1 pre-fetch instructions 920. Where the MMU translation cache is a TLB, the pre-fetch instructions 920 may be one or more TLB pre-fetch instructions.

Figure 10:
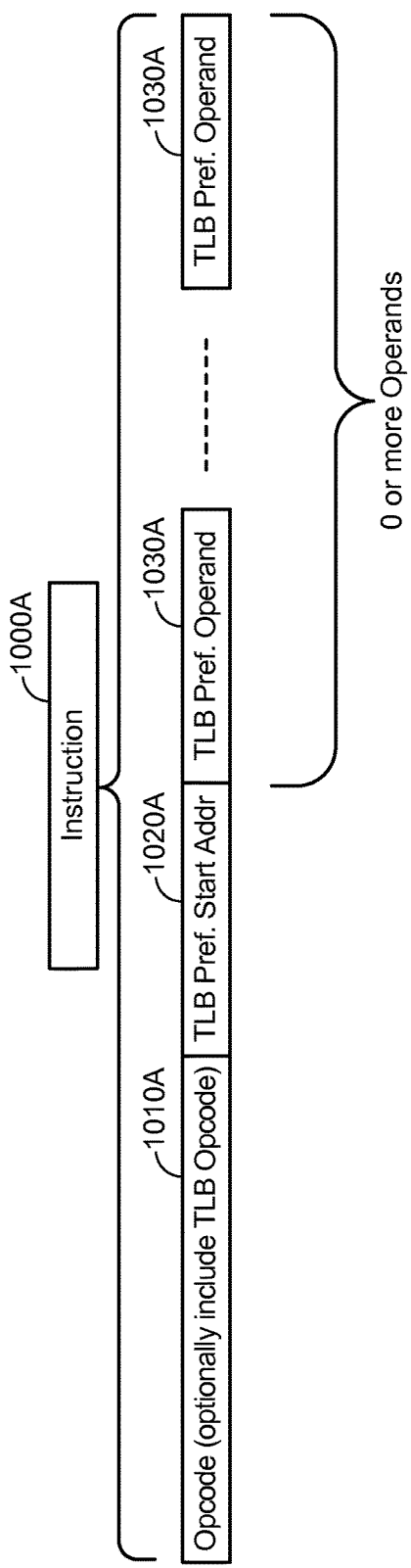
FIG. 10 illustrates exemplary translation look-aside buffer (TLB) pre-fetch instructions according to an aspect of the disclosure.
Figure 10:
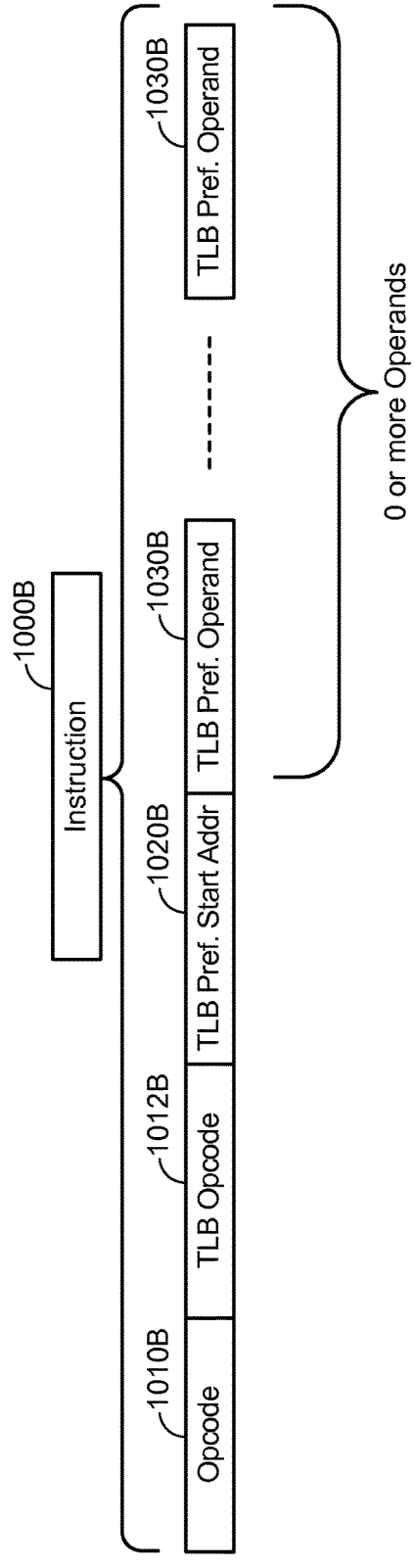

FIG. 10 illustrates exemplary TLB pre-fetch instructions 1000A and 1000B according to an aspect of the disclosure. TLB pre-fetch instructions 1000A and 1000B may correspond to the pre-fetch instructions 920 in FIG. 9. Although illustrated as TLB pre-fetch instructions, it will be appreciated that TLB pre-fetch instructions 1000A and 1000B are applicable to any type of translation cache.

Each TLB pre-fetch instruction 1000A and 1000B contains an Opcode field 1010A and 1010B, which differentiates the TLB pre-fetch instructions from the main instructions (e.g., instructions 910 in FIG. 9). As illustrated by TLB pre-fetch instruction 1000A, the Opcode field 1010A optionally includes TLB pre-fetch opcode information. The TLB opcode is required if more than one TLB pre-fetch type is required and no explicit TLB opcode field exists.

Alternatively, as illustrated by TLB pre-fetch instruction 1000B, the TLB pre-fetch opcode information may be a separate TLB opcode field 1012B. The TLB opcode field 1012B is interpreted by the MMU and used to indicate the type of TLB pre-fetch. The TLB opcode is required if more than one TLB pre-fetch type is required.

TLB pre-fetch instructions 1000A and 1000B further include a TLB pre-fetch start address 1020A and 1020B. The TLB pre-fetch start address 1020A or 1020B is required, and indicates the address to start TLB pre-fetches. As discussed below with reference to FIG. 11, depending on the TLB instruction type, the MMU may perform more than one TLB pre-fetch per TLB pre-fetch instruction.

Figure 11:
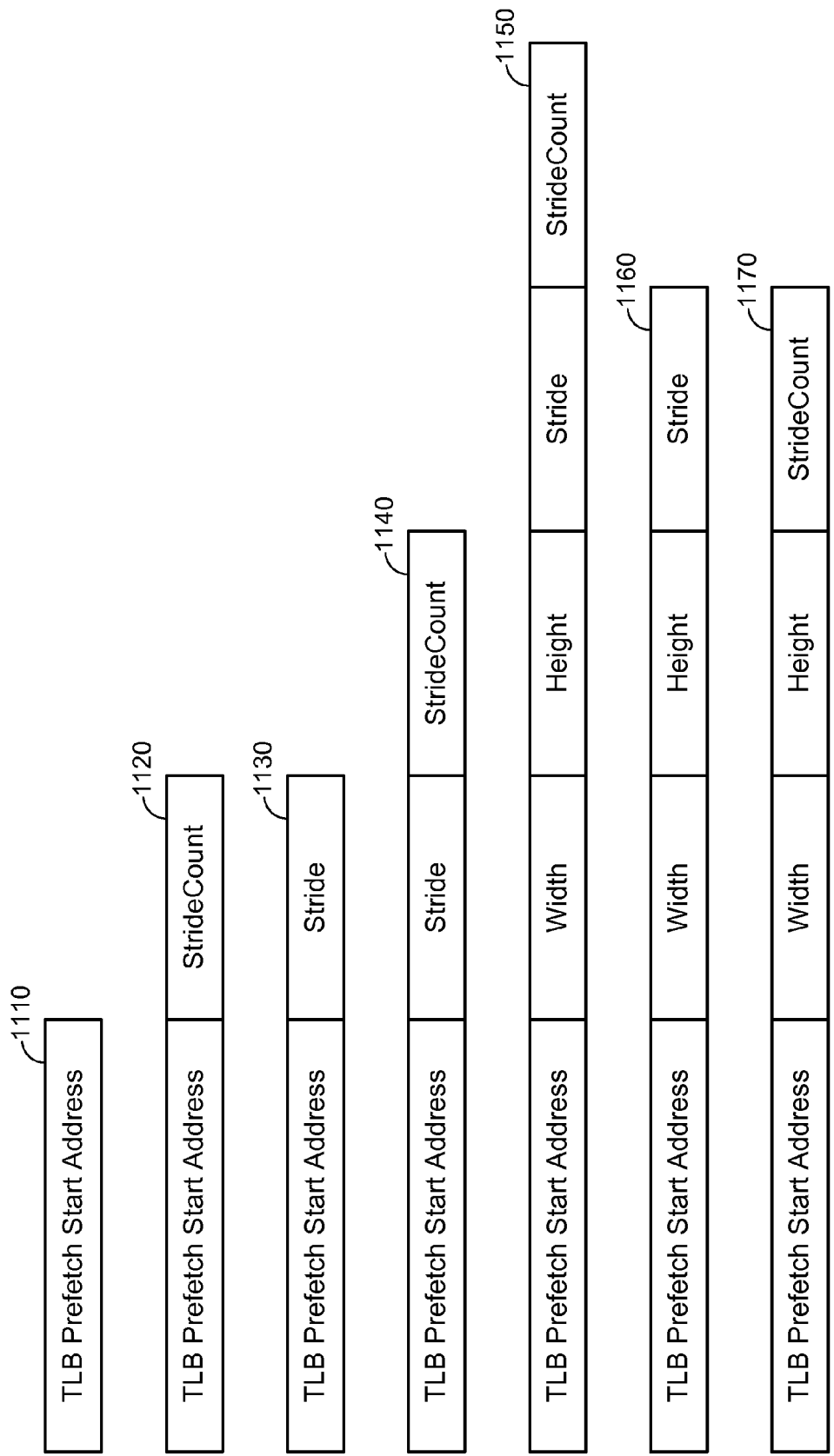
FIG. 11 illustrates example descriptions of subsequent TLB pre-fetch addresses according to an aspect of the disclosure.

The TLB pre-fetch instructions 1000A and 1000B further include zero or more TLB pre-fetch operands 1030A and 1030B to describe the set of addresses for subsequent TLB pre-fetch addresses. There are several possibilities for describing the subsequent TLB pre-fetch addresses, as illustrated in FIG. 11. Specifically, FIG. 11 illustrates several exemplary TLB pre-fetch instructions, which may correspond to TLB pre-fetch instructions 1000A and 1000B, with various exemplary TLB pre-fetch operands, such as TLB pre-fetch operands 1030A and 1030B.

Referring to FIG. 11, a TLB pre-fetch instruction 1110 may include only the TLB pre-fetch start address, such as TLB pre-fetch start address 1020A or 1020B. Alternatively, a TLB pre-fetch instruction 1120 may include a strideCount (i.e., the number of TLB pre-fetches). The stride (i.e., the address range between subsequent TLB pre-fetches) would be implied or fixed based on the TLB opcode/Instruction type.

As another alternative, a TLB pre-fetch instruction 1130 may include a stride operand (e.g., the address range between subsequent TLB prefetches) and the strideCount would be implied or fixed based on the TLB opcode/ instruction type.

As another alternative, a TLB pre-fetch instruction 1140 may include a strideCount (i.e., the number of TLB pre-fetches) and an explicit stride value/operand.

Similar variants can be used in combination with a memory block descriptor, such as start address, height, and width, to issue pre-fetches that are only related to the memory block. For example, a TLB pre-fetch instruction 1150 may include the TLB pre-fetch start address and explicit width, height, stride, and strideCount operands. As another example, a TLB pre-fetch instruction 1160 may include the TLB pre-fetch start address and explicit width, height, and stride operands. As yet another example, a TLB pre-fetch instruction 1170 may include the TLB pre-fetch start address and explicit width, height, and strideCount operands.

A single pre-fetch instruction may instruct the MMU to pre-fetch a single address or multiple addresses. To pre-fetch multiple addresses, a pre-fetch instruction (or command) may, for example, instruct the MMU to pre-fetch address 1000+n*(m=4094) for n=0 to 3. To accomplish this, a single pre-fetch instruction could specify the parameters n=strideCount (e.g., 1140 in FIG. 11) or m=Stride (e.g., 1130 in FIG. 11), for example. These parameters could be provided as additional bits sent to the MMU along with the pre-fetch instruction, and/or reusing address bits [11:0].

Figure 12:
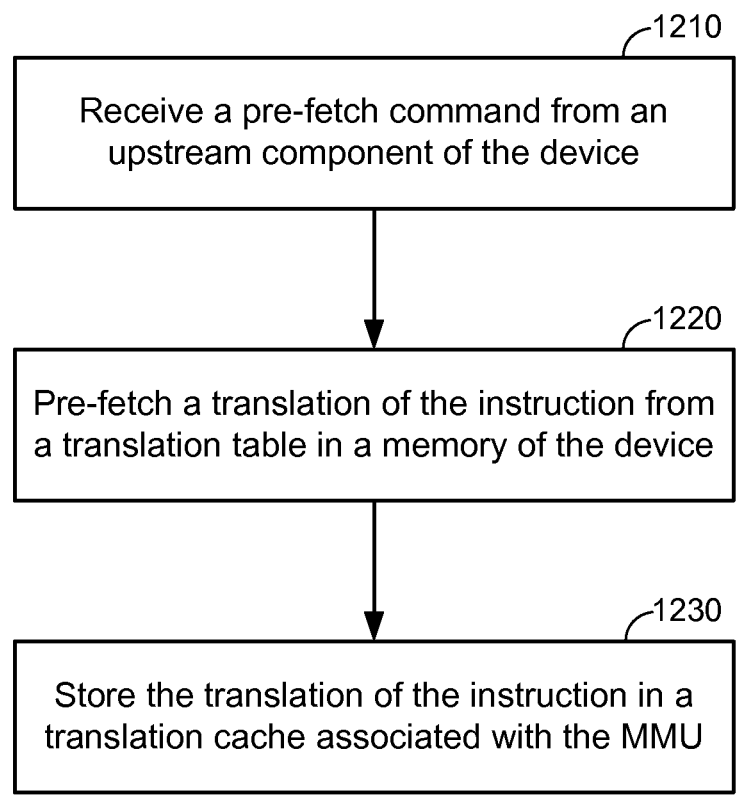
FIG. 12 illustrates an exemplary flow for pre-fetching address translations in an MMU according to an aspect of the disclosure.

FIG. 12 illustrates an exemplary flow for pre-fetching address translations in an MMU, such as MMU 404 or SMMU 416/418 in FIGS. 4A/4B. At 1210, the MMU receives a pre-fetch command, such as TLB pre-fetch instruction 1000A/B in FIG. 10, from an upstream component, such as devices 410A/B/C in FIGS. 4A/4B. The pre-fetch command may include an address, such as TLB pre-fetch start address 1020A/B in FIG. 10, of an instruction, such as instruction 800 in FIG. 8. The pre-fetch command may also include one or more parameters specifying a plurality of target address to be pre-fetched by the MMU. The upstream component may be a central processor of the device, such as processor 402 in FIGS. 4A/4B.

In an embodiment, the MMU may be coupled to the upstream component via a shared system interconnect, such as interconnect 412 in FIGS. 4A/4B. In that case, the pre-fetch command may include at least one field to indicate to the MMU that the pre-fetch command is a pre-fetch command. The MMU may also include other fields relating to the pre-fetch command, and some fields may be encoded on address bits [11:0] associated with the pre-fetch command. Alternatively, the MMU may be coupled to the upstream component via an interconnect dedicated to communicating pre-fetch commands between the upstream component and the MMU, such as interfaces 420A-B in FIG. 4B.

In an embodiment, the pre-fetch command may be generated by the upstream component or a software compiler. Alternatively, the pre-fetch command may be present in human-readable software code being executed by the upstream component.

In an embodiment, the instruction may be an instruction to pre-fetch translations relating to one or more target addresses that are likely to be needed by the upstream component. Alternatively, or additionally, the instruction may be an instruction to pre-fetch translations relating to one or more target addresses that are guaranteed to be needed by the upstream component.

At 1220, the MMU pre-fetches a translation of the instruction, such as translation cache entry 600, from a translation table, such as translation table 422 in FIGS. 4A/4B, in a memory of the device, such as memory 406 in FIGS. 4A/4B.

At 1230, the MMU stores the translation of the instruction in a translation cache, such as translation cache 426/428 in FIGS. 4A/4B, associated with the MMU. The MMU does not forward the pre-fetch command to a downstream component of the device.

Although not illustrated in FIG. 12, the flow may further include determining whether or not the translation of the instruction is present in the translation cache. In this case, pre-fetching the translation of the instruction from the translation table at 1220 may be performed based on the translation of the instruction not being present in the translation cache, and the determining, the pre-fetching at 1220, and the storing at 1230 may be performed after the pre-fetch command is received from the upstream component of the device.

Further, although not illustrated in FIG. 12, the flow may include determining whether or not a fault occurred during the pre-fetching. Based on a fault occurring during the pre-fetching, the MMU may terminate execution of the pre-fetch command. Additionally, based on the fault occurring during the pre-fetching, the MMU may ignore the fault.

Further still, although not illustrated in FIG. 12, the flow may include terminating execution of the pre-fetch command and sending one or more responses to the upstream component indicating whether or not the pre-fetch command was received and/or executed successfully.

Figure 13:
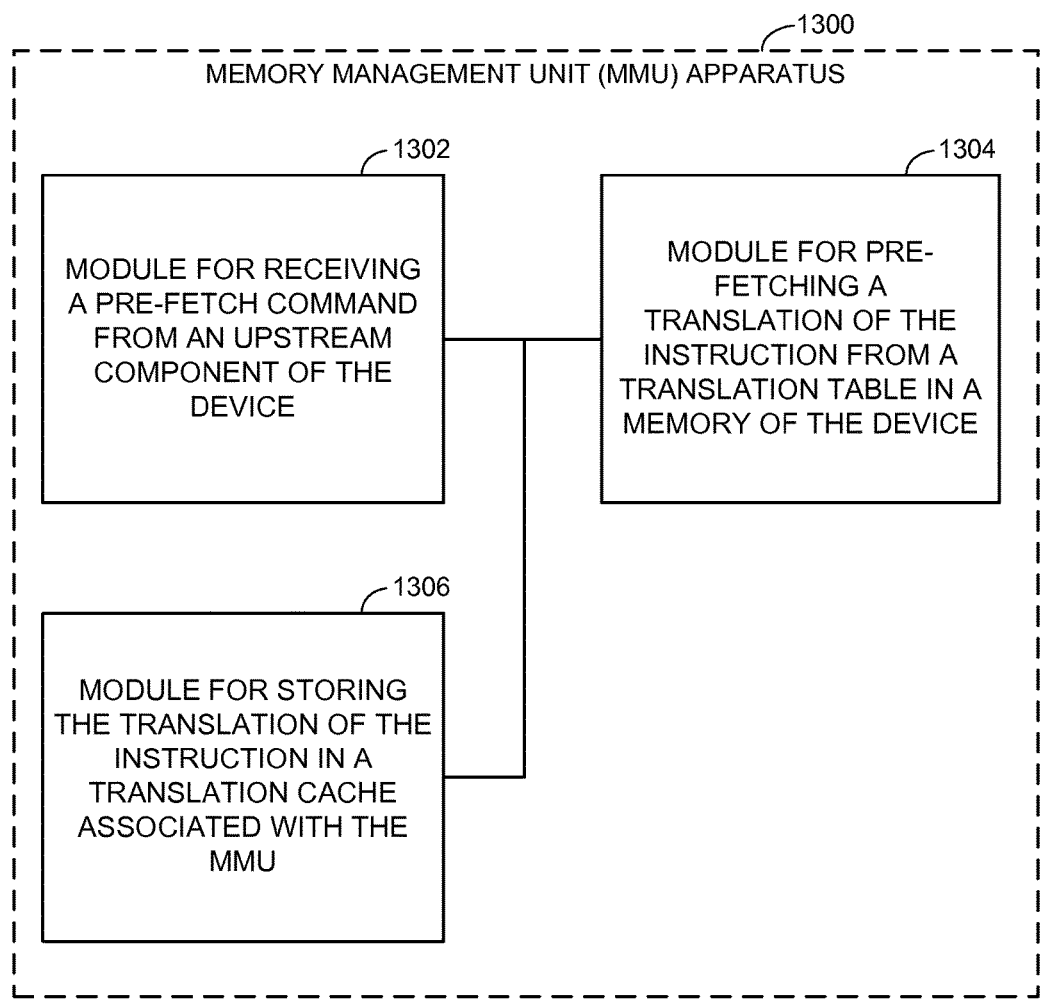
FIG. 13 is another simplified block diagrams of several sample aspects of an apparatus configured to support communication as taught herein.

FIG. 13 illustrates an example MMU apparatus 1300 represented as a series of interrelated functional modules. The MMU apparatus 1300 includes a module for receiving 1302, a module for pre-fetching 1304, and a module for storing 1306, as discussed herein. These modules may correspond to hardware circuitry of the MMU, or may be software modules executable by the MMU apparatus 1300 or a corresponding processor. Thus, the functionality of the modules of FIG. 13 may be implemented in various ways consistent with the teachings herein. In some designs, the functionality of these modules may be implemented as one or more electrical components/circuits. In some designs, the functionality of these blocks may be implemented as a processing system including one or more MMU components/circuits. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 13, as well as other components and functions described herein, may be implemented using any suitable means. Such means also may be implemented, at least in part, using corresponding structure as taught herein. For example, the components described above in conjunction with the "module for" components of FIG. 13 also may correspond to similarly designated "means for" functionality. Thus, in some aspects one or more of such means may be implemented using one or more of processor components, integrated circuits, or other suitable structure as taught herein. Further, the various modules illustrated in FIG. 13 may be referred to as "logic configured to" perform the corresponding functionality.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of pre-fetching address translations in a memory management unit (MMU) of a device, comprising:
   receiving, by the MMU, a pre-fetch command from an upstream component of the device, the pre-fetch command including an address of an instruction, the pre-fetch command received by the MMU before a request for the address of the instruction is received from the upstream component;
   pre-fetching, by the MMU, a translation of the address of the instruction from a translation table in a memory of the device before the MMU receives the request for the address of the instruction from the upstream component;
   storing, by the MMU, the translation of the address of the instruction in a translation cache associated with the MMU before the MMU receives the request for the address of the instruction from the upstream component; and receiving, by the MMU, the request for the address of the instruction from the upstream component.

2. The method of claim 1, further comprising:
determining whether or not the translation of the address of the instruction is present in the translation cache,
wherein the pre-fetching the translation of the address of the instruction from the translation table is performed based on the translation of the address of the instruction not being present in the translation cache, and
wherein the determining, the pre-fetching, and the storing are performed after the pre-fetch command is received from the upstream component of the device.

3. The method of claim 1, further comprising:
determining whether or not a fault occurred during the pre-fetching; and
based on the fault occurring during the pre-fetching, terminating execution of the pre-fetch command.

4. The method of claim 3, further comprising:
based on the fault occurring during the pre-fetching, ignoring the fault.

5. The method of claim 1, further comprising:
terminating execution of the pre-fetch command; and
sending one or more responses to the upstream component indicating whether or not the pre-fetch command was received and/or executed successfully.

6. The method of claim 1, wherein the upstream component comprises a central processor of the device.

7. The method of claim 1, wherein the pre-fetch command includes one or more parameters specifying a plurality of target addresses to be pre-fetched by the MMU.

8. The method of claim 1, wherein the MMU is coupled to the upstream component via a shared system interconnect.

9. The method of claim 8, wherein the pre-fetch command comprises at least one field to indicate to the MMU that the pre-fetch command is a pre-fetch command.

10. The method of claim 9, wherein the at least one field is encoded in bits [11:0] of the pre-fetch command.

11. The method of claim 1, wherein the MMU is coupled to the upstream component via an interconnect dedicated to communicating pre-fetch commands between the upstream component and the MMU.

12. The method of claim 1, wherein the pre-fetch command is generated by the upstream component or a software compiler.

13. The method of claim 1, wherein the pre-fetch command is present in human-readable software code being executed by the upstream component.

14. The method of claim 1, wherein the pre-fetch command comprises an instruction to pre-fetch translations relating to one or more target addresses of instructions that are likely to be needed by the upstream component.

15. The method of claim 1, wherein the pre-fetch command comprises an instruction to pre-fetch translations relating to one or more target addresses of instructions that are guaranteed to be needed by the upstream component.

16. The method of claim 1, wherein the MMU does not forward the pre-fetch command to a downstream component of the device.

17. An apparatus for pre-fetching address translations in a memory management unit (MMU) of a device, comprising:
a logic circuit of the MMU configured to receive a pre-fetch command from an upstream component of the device, the pre-fetch command including an address of an instruction, the pre-fetch command received by the MMU before a request for the address of the instruction is received from the upstream component;
a logic circuit of the MMU configured to pre-fetch a translation of the address of the instruction from a translation table in a memory of the device before the MMU receives the request for the address of the instruction from the upstream component;
a logic circuit of the MMU configured to store the translation of the address of the instruction in a translation cache associated with the MMU before the MMU receives the request for the address of the instruction from the upstream component; and
a logic circuit of the MMU configured to receive the request for the address of the instruction from the upstream component.

18. The apparatus of claim 17, further comprising:
a logic circuit of the MMU configured to determine whether or not the translation of the address of the instruction is present in the translation cache,
wherein the pre-fetch of the translation of the address of the instruction from the translation table is performed based on the translation of the address of the instruction not being present in the translation cache, and
wherein the determination, the pre-fetch, and the store are performed after the pre-fetch command is received from the upstream component of the device.

19. The apparatus of claim 17, further comprising:
a logic circuit of the MMU configured to determine whether or not a fault occurred during the pre-fetching; and
a logic circuit of the MMU configured to terminate, based on the fault occurring during the pre-fetching, execution of the pre-fetch command.

20. The apparatus of claim 17, further comprising:
a logic circuit of the MMU configured to terminate execution of the pre-fetch command; and
a logic circuit of the MMU configured to send one or more responses to the upstream component indicating whether or not the pre-fetch command was received and/or executed successfully.

21. The apparatus of claim 17, wherein the pre-fetch command includes one or more parameters specifying a plurality of target address to be pre-fetched by the MMU.

22. The apparatus of claim 17, wherein the MMU is coupled to the upstream component via a shared system interconnect.

23. The apparatus of claim 17, wherein the MMU is coupled to the upstream component via an interconnect dedicated to communicating pre-fetch commands between the upstream component and the MMU.

24. The apparatus of claim 17, wherein the pre-fetch command is generated by the upstream component or a software compiler.

25. The apparatus of claim 17, wherein the pre-fetch command is present in human-readable software code being executed by the upstream component.

26. The apparatus of claim 17, wherein the pre-fetch command comprises an instruction to pre-fetch translations relating to one or more target addresses of instructions that are likely to be needed by the upstream component.

27. The apparatus of claim 17, wherein the pre-fetch command comprises an instruction to pre-fetch translations relating to one or more target addresses of instructions that are guaranteed to be needed by the upstream component.

28. The apparatus of claim 17, wherein the MMU does not forward the pre-fetch command to a downstream component of the device.

29. An apparatus for pre-fetching address translations in a memory management unit (MMU) of a device, comprising:
- means for receiving, by the MMU, a pre-fetch command from an upstream component of the device, the pre-fetch command including an address of an instruction, the pre-fetch command received by the MMU before a request for the address of the instruction is received from the upstream component;
- means for pre-fetching, by the MMU, a translation of the address of the instruction from a translation table in a memory of the device before the MMU receives the request for the address of the instruction from the upstream component;
- means for storing, by the MMU, the translation of the address of the instruction in a translation cache associated with the MMU before the MMU receives the request for the address of the instruction from the upstream component; and
- means for receiving, by the MMU, the request for the address of the instruction from the upstream component.

30. A non-transitory computer-readable medium for pre-fetching address translations in a memory management unit (MMU) of a device, comprising:
- at least one instruction instructing the MMU to receive a pre-fetch command from an upstream component of the device, the pre-fetch command including an address of an instruction, the pre-fetch command received by the MMU before a request for the address of the instruction is received from the upstream component;
- at least one instruction instructing the MMU to pre-fetch a translation of the address of the instruction from a translation table in a memory of the device before the MMU receives the request for the address of the instruction from the upstream component;
- at least one instruction instructing the MMU to store the translation of the address of the instruction in a translation cache associated with the MMU before the MMU receives the request for the address of the instruction from the upstream component; and
- at least one instruction instructing the MMU to receive the request for the address of the instruction from the upstream component.

* * * * *